Oct. 8, 1963 C. H. NEHLS Re. 25,459
LOCKING CLOSURE
Original Filed April 12, 1955
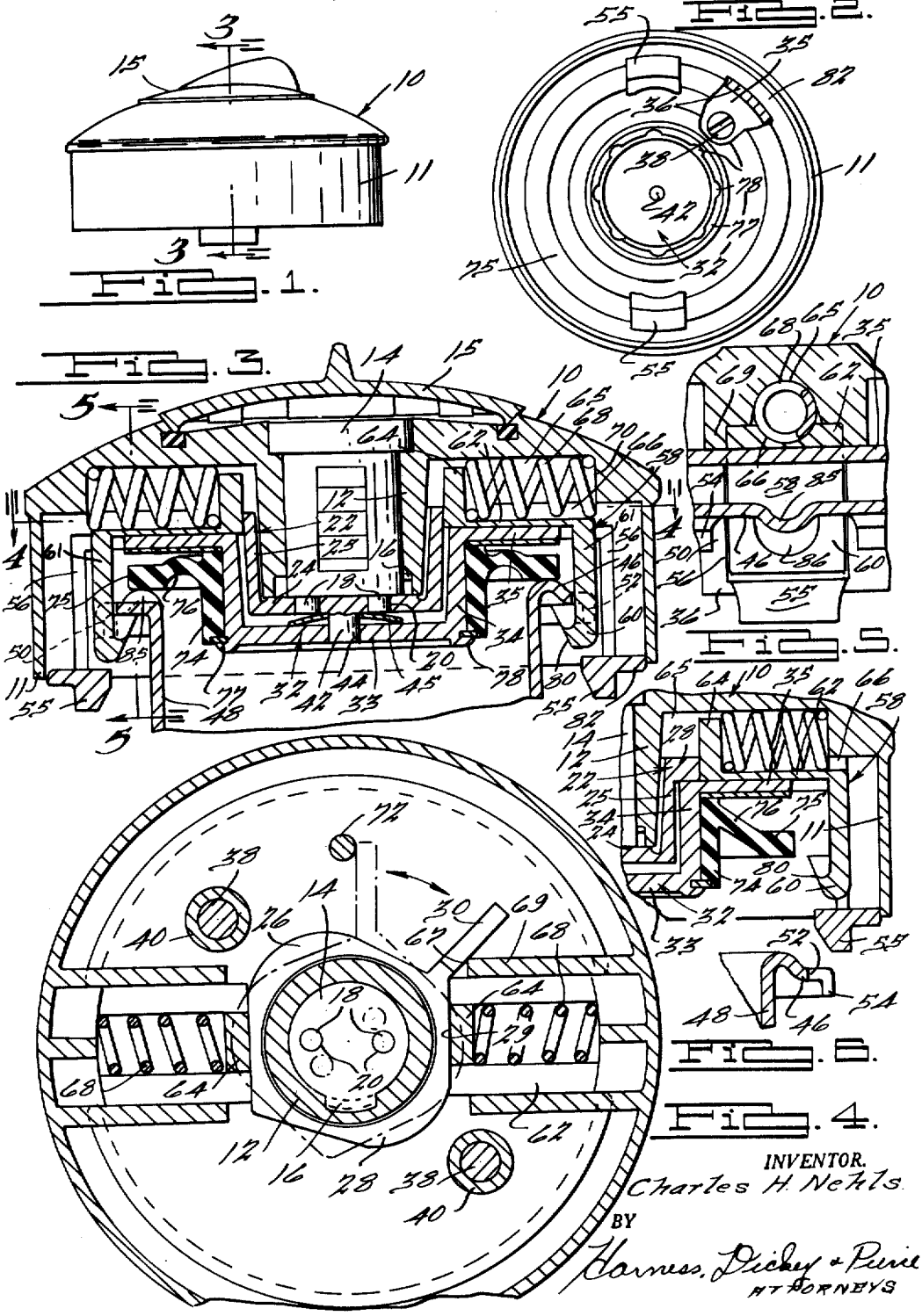
INVENTOR.
Charles H. Nehls
BY
Harness, Dickey & Pierce
ATTORNEYS United States Patent Office Re. 25,459
Reissued Oct. 8, 1963

25,459
LOCKING CLOSURE

Charles H. Nehls, Grosse Point, Mich., assignor to Wayne Metalcraft Company, Chicago, Ill., a corporation of Illinois Original No. 2,880,604, dated Apr. 7, 1959, Ser. No. 500,765, Apr. 12, 1955. Application for reissue May 5, 1960, Ser. No. 10,010
10 Claims. (Cl. 70—169)

Matter enclosed in heavy brackets [ ] appears in the original patent but forms no part of this reissue specification; matter printed in italics indicates the additions made by reissue.

The present invention relates to improvements in locking covers, particularly for the gasoline tanks of automobiles.

An important object of this invention is to provide an improved locking cap construction adapted to be secured upon a filler neck of the type having an outwardly projecting locking flange.

It has become common, in the construction of automobiles, to locate the gasoline filler neck and cap in a relatively confined recess in the car body, and to construct the neck and an externally projecting flange for engagement with the holding parts of a conventional, nonlocking cap. The recess is also frequently covered by a door provided with a spring which tends to close the door. When a locking cap is employed, it is of course necessary to manipulate the key as well as to turn the cap itself, and this ordinarily necessitates the use of both hands within the space afforded by the confined recess. Not only is this difficult in such a confined space, but where the locking mechanism must engage an external flange, it has been found difficult to encompass the necessary mechanism within a cap structure small enough to provide clearance between the cap and the walls of the recess, to provide room for the hand and fingers to grasp the exterior of the cap and permit removal thereof.

It is accordingly an important object of this invention to provide an improved cap which is small in diameter, which is provided with lock bolts arranged to engage an outwardly projecting flange, and the dimensions of which are such that the cap is little or no greater in diameter than a conventional nonlocking cap, and can easily be accommodated, and manipulated, within the confined space provided for the gasoline cap.

Another object is to provide such a locking cap wherein, although the lock bolt means is located near the periphery and adapted to engage an external flange, such bolt means is effectively shielded against manipulation by anyone who might attempt to pick the lock.

Another object is to provide such a locking cap which is neat in appearance and of simple, inexpensive but rugged construction.

Other objects and advantages of the invention will become apparent upon consideration of the present disclosure in its entirety.

In the drawing:

FIGURE 1 is a side elevational view of a cap constructed in accordance with the present invention;

FIG. 2 is a bottom plan view thereof, partly broken away;

FIG. 3 is a cross section on a larger scale, taken substantially on the line 3—3 of FIG. 1, and looking in the direction of the arrows, showing the cap locked in position upon a fragmentarily illustrated filler neck;

FIG. 4 is a sectional plan view taken substantially on the line 4—4 of FIG. 3, and looking in the direction of the arrows;

FIG. 5 is a sectional detail taken substantially on the line 5—5 of FIG. 3, and looking in the direction of the arrows; and FIG. 6 is a fragmentary radial sectional view showing the cap detached and the positioning of one of the lock bolts when retracted.

Referring now to the drawing, reference character 10 designates generally the body of my improved cap, which is of bell-shape and the exact contouring of which is subject to variation, as will be appreciated. Integral with the cap body and projecting axially downwardly within area [surrounding] *surrounded* by the integral skirt portion 11 is a hollow cylindrical boss 12 which defines a lock cylinder within which a conventional lock plug 14 is accommodated. The lock plug is shown as of the plate tumbler type, its key slot being accessible at the top of the cap and shielded by a pivoted dust cover 15. The details of the cylinder, plug and dust cover form no part of my present invention and are subject to variation. The plug is rotatably secured in the cylinder in any suitable manner, as by a detent plate 16 and is provided with integral nonconcentric lug-type actuating portions 18 projecting downwardly from its lower end into holes 20 in a cup-shaped cam member 22.

The cam member 22 is provided with a flat bottom portion 24 extending transversely beneath the cylinder 12 and with a substantial cylindrical portion 25 extending upwardly around and rotatable with respect to the cylinder 12. At its upper rim the cylindrical portion 25 carries two diametrically opposed radially extending bolt actuating cam lobe portions 26, 28 and an integral stop portion 30 which limits the angular rotation of the cam cup and the lock cylinder.

The cam cup 22 is retained in position by a retaining member generally designated 32 having a central cup-shaped portion somewhat larger than and nested over the cam cup, the cup portion of the retaining member consisting of a flat bottom portion 33 and a cylindrical wall 34. From the rim of the cylindrical wall 34 an integral upper flat portion 35 extends outwardly to a position near but spaced from the skirt 11, where it is provided with an integral downturned cylindrical skirt 36 concentric with skirt 11. The retainer 32 is rigidly positioned with respect to the cap body by a pair of screws 38 which extend through suitable holes (undesignated) in the flat portion 35 into suitably tapped bosses 40 which may be cast integrally with and project downwardly from the inside of the top of the cap body. When so secured in position, the cupped portion of the retainer is concentric with but slightly spaced from the cupped portion of cam 22, and the skirt 36 is concentric with but spaced from skirt 11. The cam cup is provided with an axially positioned downwardly extending bearing boss portion 42 which projects into an axial bearing hole 44 in the flat bottom portion 33 of the retainer. A bowed leaf spring 45 is also provided between the flat bottom portions 24—33 of the cam cup and retainer, urging the cam upwardly and preventing rattling.

The internal diameter of the retainer skirt portion 36 is such as to clear but to fit relatively closely around the periphery of the outturned flange as 46 of filler necks, as 48, of the type the cap is intended to fit. Such filler necks are also customarily provided with diametrically opposed notches, as 50, 52, extending inwardly from the periphery, to provide clearance for downwardly and inwardly return-bent holding fingers which are provided on conventional nonlocking caps, and which act like bayonet lock means to removably hold such nonlocking caps, by cooperation with inclined depending skirt walls, as 54, on the periphery of the filler neck flange 52. My improved locking cap mechanism does not coact with such inclined depending walls 54, but with the outturned or flat neck flange 46 in the areas of the notches 50, 52. The skirt 36 of the retainer carries rigidly affixed to its lower edge a pair of diametrically opposed lugs 55 which project inwardly far enough so that the space between them is less than the maximum diameter of the filler neck flange 46 except in the areas of the notches 50, 52 through which such lugs are proportioned, and positioned, to fit. Thus the cap can only be applied to the filler neck by orienting it so the lugs 55 pass through the notches 50—52. Directly above each of the lugs 55, a vertical slot 56 is provided extending entirely through the skirt wall 36 and also extending radially inwardly part way through the flat upper portion 35 of the retainer. A pair of latch bolts are provided, each generally designated 58, each having a supporting portion 62 retained between the top of the cap and the flat web 35 of the retainer and radially slidable therebetween. Each bolt has a downwardly extending arm 61 movable through the slot 56 and an inwardly and upwardly turned terminal holding portion 60 adapted to underlie the outturned flange portion 46 of the filler neck, in one of the notched areas, to hold the cap in position, as shown in FIG. 3. It will be seen that the slots 50, 52 only extend inwardly about half the radial distance of the flange 46, and that when the bolts are moved outwardly to the released positioning shown in FIG. 6, the hooked retaining portions as 60 thereof, although still extending part way into the notch, clear the flange, in the notched area, so that the cap can be removed. As shown in FIGS. 3 and 6, the supporting portion 62 of each bolt extends inwardly directly over and in slidable engagement with the flat top wall 35 of the retainer. At its inner extremity, the flat portion 62 of each bolt is provided with an upturned lug portion 64 which extends into and substantially fills the cross section of a radially extending partly cylindrical slot 65 formed in the undersurface of the top of the cap body. The upper surface of the flat portion 62 of the latch member 58 is also provided with a partly cylindrical slot 66 which coacts with the slot portion 65 to enclose a helical compression spring 68 housed in such slot portions and bearing outwardly against the flat outer wall portion 70 of the slot 65 and urging the latch member radially inwardly toward the latched position.

The upper extremity or rim portion of the cam cup 22 projects into the space between the lugs 64 and the wall of cylinder 12 so that when the cup 22 is turned by means of the lock plug the cam lobes 26, 28 may bear outwardly against the lugs 64 to move the latch bolt members 58 outwardly to the released position. The areas of the rim of the cup 22, between the lobes 26, which engage the lugs 64 when the bolts are in the locked position, may be flattened, as indicated at 29, as well as reduced in diameter, so that the springs 68 tend to turn the cam cup and lock plug to the locked position, as well as to project the bolts inwardly into holding underengagement with the filler neck flange.

The limits of angular travel of the actuating cam cup and lock plug are defined by an arm 30 cast integrally with the rim of the cam cup 22 and which bears against a corner 67 defined by a relieved portion of the cap defining a bolt guideway 69 when the cam is in the locked position, as shown in full lines in FIG. 4, and against an integral stop lug 72 depending interiorly from the top of the cap body, when in the released position, as shown in broken lines.

A sealing gasket is provided which is preferably formed of relatively soft synthetic rubber, and which includes a cylindrical sleeve portion 74 fitted on the exterior of the cylindrical central cupped portion 34 of the retainer, and an annular pad portion 75 adapted to engage and bear downwardly against the top of the filler neck when the cap is in place. The annular pad portion 75 is joined to the sleeve portion 74 by an upwardly and inwardly inclined section 76 which is conic when relaxed, as shown in FIG. 6, but deformed upwardly by the imparting of an annular wave thereto, as shown in FIG. 3, when the cap is pressed downwardly to the locked position. The material of the seal, in the conic section 76 thereof, may be resilient enough to act as a spring, tending to push the cap upwardly to free the latch bolts and assist removal of the cap, when the bolts are moved outwardly. The seal is retained by a metallic washer 77 which is in turn held by staking outwardly portions as 78 of the cup section of the retainer over which the washer is fitted.

The inner ends of the hooked holding portions 60 of the bolt members may be inclined as indicated at 80, so that the latch bolts are cammed outwardly when the cap is forced downwardly into position. Thus the key is not required in order to attach the cap.

The lug portions 55 project inwardly below the latch bolts, and to positions relatively close to the filler neck.

The skirt 36 of the retainer is provided at its lower extremity with an integral outwardly extending flange 82 which projects substantially to engagement with the inner wall of skirt 11. The flange 82 is not interrupted in the areas of the slots 56, and such flange, and the lugs 55, accordingly shield the latch bolts and effectively prevent unauthorized manipulation thereof from the outside by anyone attempting to pick the lock.

It is common to provide an air vent for the tank by deforming a portion of the filler neck, including the flange 46, in the area of one of the previously mentioned slots as 50, as best shown in FIG. 5. In the construction illustrated, a generally V-shaped depression 85 is provided in the filler neck flange 46, such depression being centered with respect to the slot 50. The upwardly hooked retaining portions 60 of the latch bolts are centrally relieved by the formation of notchlike cutout or kerfed areas 86 therein. Thus in whichever of the two diametrically reversed positions the cap is applied to the filler neck, the kerfed area of one of the bolts will straddle the depressed flange portion which defines the notch 85, to properly secure the cap.

While it will be apparent that the preferred embodiment of the invention herein described is well calculated to fulfill the objects and advantages first above stated, it will be appreciated that the invention is susceptible to variations, modification and change without departing from the fair meaning and proper scope of the appended claims.

I claim:

1. In a locking cap construction for a filler neck or the like having outwardly projecting abutment areas adapted to serve as latch keeper means, a cap body, a hollow lock cylinder boss portion rigidly carried by and extending downwardly with respect to said body, a lock cylinder plug mounted in said boss portion, an actuating portion carried by said plug, an actuating cam embracing and rotatable upon said boss portion and operatively interengaged with and adapted to be actuated by said actuating portion, a retainer including a cup-shaped portion extending around said actuating cam and fixed with respect to said body, said cam being rotatable between said boss portion and said cup-shaped portion, bolt means including a part slidably supported between said body and retainer and extending outwardly above said cup-shaped portion and including another part extending downwardly in a position to lie outside one of said abutment areas, and cam lobe means carried by an upper portion of said cam member and engageable with said bolt means to actuate the latter.

2. In a locking cap construction for a filler neck or the like having outwardly projecting abutment areas adapted to serve as latch keeper means, a cap body having a hollow generally cylindrical downwardly extending boss adapted to serve as a cylinder for a lock plug, a lock cylinder plug mounted in said boss, an actuating portion carried by said plug and exposed at the bottom of said boss, a cup-shaped actuating cam embracing and rotatable upon said boss and operatively interengaged with and adapted to be actuated by said actuating portion, a retainer including a cup-shaped portion nestedly overfitted upon said actuating cam, said retainer being fixed with respect to said body to define a rigid assembly therewith, said cam being rotatable between said boss and said cup-shaped portion, bolt means including a part slidably supported between said body and retainer and extending outwardly above said cup-shaped portion and including another part extending downwardly in a position to lie outside one of said abutment areas, and cam means carried by an upper portion of said cup-shaped cam member and engageable with said bolt means to actuate the latter, said body portion being provided with a skirtlike peripheral flange extending downwardly around and spaced outwardly from said interfitted portions, and an inner skirtlike flange carried by said retainer and extending downwardly substantially parallel to said peripheral flange, said bolt means being movable in a substantially radial path through an opening in said retainer and inner skirtlike flange.

3. In a locking cap construction for a filler neck or the like having outwardly projecting abutment areas adapted to serve as latch keeper means, a cap body having a hollow generally cylindrical downwardly extending boss adapted to serve as a cylinder for a lock plug, a lock cylinder plug mounted in said boss, an actuating portion carried by said plug and exposed at the bottom of said boss, a cup-shaped actuating cam embracing and rotatable upon said boss and operatively interengaged with and adapted to be actuated by said actuating portion, a cup-shaped retainer portion nestedly overfitted upon said actuating cam and fixed with respect to said body, said cam being rotatable between said boss and said cup-shaped retainer portion, bolt means including a part slidably supported between said body and retainer portion and another part extending outwardly above said retainer portion and thence downwardly in a position to lie outside one of said abutment areas, and cam means carried by an upper portion of said cup-shaped cam member and engageable with said bolt means to actuate the latter, said body portion being provided with a skirtlike peripheral flange extending downwardly around and spaced outwardly from said interfitted portion, and a second skirtlike flange carried by said retainer and extending downwardly therefrom substantially parallel to but spaced inwardly from said first mentioned skirtlike flange, said bolt means being movable in a substantially radial path through an opening which extends through said retainer and through said second skirtlike flange, and wall portions substantially joining the lower free extremities of said skirtlike flanges and preventing access to said bolt means through the space between said skirtlike flanges.

4. A locking cover construction as defined in claim 2 intended for use with a filler neck or the like having abutment areas as defined and having rim flange portions extending radially outwardly beyond said abutment areas on opposite sides of said abutment areas, and keying portions carried by said assembly defined by said retainer and body and adapted to pass through the space between said radially extending flange portions and preventing fitting the cover over the neck except in a predetermined orientation, said bolt means being aligned with said keying portions.

*5. An actuating mechanism for a key actuated locking closure of the type having a latch bolt member positioned in a recess between a pair of connected members; said actuating mechanism comprising, in combination: a lock plug rotatably mounted on one of said pair of members and having a guide portion thereof extending into the recess between said pair of members; a pair of elongated parallel spaced guide flanges defined on one of said pair of members and extending into said recess to define a channel extending radially of said lock plug and in which said guide portion of the latch bolt member is slidably disposed; a rollback cam member on said lock plug positioned in said recess and operatively associated with said guide portion of said latch bolt, spring means normally biasing said latch bolt in one direction along said channel toward said cam member; said lock plug with cam member being pivotable against the bias of said spring means to move said latch bolt along said channel in the other direction; said elongated guide flanges terminating at their radial inner ends spaced from the rollback cam on said lock plug, and affording clearance for accommodating movement of the rollback cam when actuating said latch bolt member, stop means on one of said pair of members extending into said recess and positioned to be engaged by said rollback cam member for limiting pivoting of said cam member in one direction, and said guide portion of the latch bolt member being of greater length than the spacing of said guide flanges from the rollback cam, so that when said guide portion of the latch bolt engages said rollback cam, a part of said guide portion remains slidably positioned between said guide flanges.*

*6. A locking closure for use with gasoline tank filler neck of the type having an inlet terminus with outwardly turned flanges provided with diametrically disposed notches in said outwardly turned flanges; said locking closure comprising, in combination: cap means defining a transverse portion and a peripheral skirt portion extending longitudinally therefrom, said transverse portion being of a size adapted to receive the filler neck terminus internally thereof; diametrically disposed elongated guide elements, defined on said cap means and extending longitudinally of said skirt portion and having portions of said guide elements located radially inwardly of the peripheral skirt portion and adapted to register with said notches in the filler neck flanges, so that only registration of said guide elements with said notches permits of connecting the locking closure to the filler neck; a hollow stud extending axially of said peripheral skirt and spaced radially inwardly of said peripheral skirt and guide elements; said guide elements being shaped to define diametrically opposed radial apertures therein; movable latch members carried by said cap means and providing inwardly extending catches facing toward the transverse portion of said cap means, and which catches are adapted to move radially inwardly and outwardly in said apertures in said guide elements; means normally biasing said catches radially inwardly of said guide elements so that said catches are adapted to engage the underside of catch engaging elements on said filler neck; and key-actuated means including a lock plug pivotally mounted in said hollow stud for selectively retracting said catches to release the closure from a filler neck.*

*7. A locking closure for use with gasoline tank filler necks of the type having an inlet terminus with outwardly turned flanges provided with diametrically disposed notches in said outwardly turned flanges; said locking closure comprising, in combination: cap means defining a transverse portion and a peripheral skirt portion extending longitudinally therefrom, said transverse portion being of a size adapted to receive the filler neck terminus internally thereof; diametrically disposed elongated guide elements, defined on said cap means and extending longitudinally of said skirt portion and having portions of said guide elements located radially inwardly of the peripheral skirt portion and adapted to register with said notches in the filler neck flanges, so that only registration of said guide elements with said notches permits of connecting the locking closure to the filler neck; a hollow stud extending axially of said peripheral skirt and spaced radially inwardly of said peripheral skirt and guide elements; said guide elements being shaped to define diametrically opposed radial apertures therein; movable latch members carried by said cap means and providing*

*inwardly extending catches facing toward the transverse portion of said cap means, and which catches are adapted to move radially inwardly and outwardly in said apertures in said guide elements; means normally biasing said catches radially inwardly of said guide elements so that said catches are adapted to engage the underside of catch engaging elements on said filler neck; and a sealing and spring-biasing gasket carried on said locking closure, including an elongated sleeve portion slip fit onto the exterior of said hollow stud and providing a conical flexing portion extending from said sleeve portion, adapted to sealingly engage a seat on said filler neck.*

*8. A locking closure for use with gasoline tank filler necks of the type having an inlet terminus with outwardly turned flanges provided with diametrically disposed notches in said outwardly turned flanges; said locking closure comprising, in combination: cap means defining a transverse portion and a peripheral skirt portion extending longitudinally therefrom, said transverse portion being of a size adapted to receive the filler neck terminus internally thereof; diametrically disposed elongated guide elements, defined on said cap means and extending longitudinally of said skirt portion and having portions of said guide elements located radially inwardly of the peripheral skirt portion and adapted to register with said notches in the filler neck flanges, so that only registration of said guide elements with said notches permits of connecting the locking closure to the filler neck; a hollow stud extending axially of said peripheral skirt and spaced radially inwardly of said peripheral skirt and guide elements; said guide elements being shaped to define diametrically opposed radial apertures therein; movable latch members carried by said cap means and providing inwardly extending catches facing toward the transverse portion of said cap means, and which catches are adapted to move radially inwardly and outwardly in said apertures in said guide elements; means normally biasing said catches radially inwardly of said guide elements so that said catches are adapted to engage the underside of catch engaging elements on said filler neck; and conical spring means carried on said stud and adapted for cooperation with a seat on said filler neck for biasing said catches against the underside of the catch-retaining elements on the filler neck, said spring means permitting axial pressure on said closure to relieve the tension on said catches by said catch-retaining elements, to permit of easier selective release of the closure from a filler neck.*

*9. A locking closure for use with gasoline tank filler necks of the type having an inlet terminus with outwardly turned flanges provided with diametrically disposed notches in said outwardly turned flanges; said locking closure comprising, in combination: cap means defining a transverse portion and a peripheral skirt portion extending longitudinal therefrom, said transverse portion being of a size adapted to receive the filler neck terminus internally thereof; diametrically disposed elongated guide elements, defined on said cap means and extending longitudinally of said skirt portion and having portions of said guide elements located radially inwardly of the peripheral skirt portion and adapted to register with said notches in the filler neck flanges, so that only registration of said guide elements with said notches permits of connecting the locking closure to the filler neck; a hollow stud extending axially of said peripheral skirt and spaced radially inwardly of said peripheral skirt and guide elements; said guide elements being shaped to define diametrically opposed radial apertures therein; movable latch members supported by said cap means and providing inwardly extending catches facing toward the transverse portion of said cap means, and which catches are adapted to move radially inwardly and outwardly in said apertures in said guide elements; means normally biasing said catches radially inwardly of said guide elements so that said catches are adapted to engage the underside of catch engaging elements on said filler neck; and conical spring means carried on said stud and adapted for cooperation with a seat on said filler neck for biasing said catches against the underside of the catch-retaining elements on the filler neck, said spring means permitting axial pressure on said closure to relieve the tension on said catches by said catch-retaining elements, to permit of easier selective release of the closure from a filler neck, said conical spring means including a sealing gasket portion for sealing against a seat on said filler neck.*

*10. A locking closure for use with gasoline tank filler necks of the type having an inlet terminus with outwardly turned flanges provided with diametrically disposed notches in said outwardly turned flanges; said locking closure comprising, in combination: cap means defining a transverse portion and a peripheral skirt portion extending longitudinally therefrom, said transverse portion being of a size adapted to receive the filler neck terminus internally thereof; diametrically disposed elongated guide elements, defined on said cap means and extending longitudinally of said skirt portion and having portions of said guide elements located radially inwardly of the peripheral skirt portion and adapted to register with said notches in the filler neck flanges, so that only registration of said guide elements with said notches permits of connecting the locking closure to the filler neck; a hollow stud extending axially of said peripheral skirt and spaced radially inwardly of said peripheral skirt and guide elements; said guide elements being shaped to define diametrically opposed radial apertures therein; movable latch members carried by said cap means and providing inwardly extending catches facing toward the transverse portion of said cap means, and which catches are adapted to move radially inwardly and outwardly in said apertures in said guide elements; means normally biasing said catches radially inwardly of said guide elements so that said catches are adapted to engage the underside of catch engaging elements on said filler neck; and conical spring means carried on said stud and adapted for cooperation with a seat on said filler neck for biasing said catches against the underside of the catch-retaining elements on the filler neck, said spring means permitting axial pressure on said closure to relieve the tension on said catches by said catch-retaining elements, to permit of easier selective release of the closure from a filler neck, said conical spring means including a sealing gasket portion for sealing against a seat on said filler neck, and said conical spring means including a pre-formed resilient member defining an axially elongated sleeve portion surrounding and engaging said stud, and a conical flexing portion of lesser thickness than the length of said sleeve portion and extending outwardly and downwardly from its juncture with said sleeve portion.*

References Cited in the file of this patent or the original patent

UNITED STATES PATENTS

| | | |
|---|---|---|
| 1,006,944 | Holdridge | Oct. 24, 1911 |
| 1,878,436 | Burroughs | Sept. 20, 1932 |
| 2,681,559 | Friend | June 22, 1954 |
| 2,696,100 | Nehls | Dec. 7, 1954 |
| 2,733,831 | Nehls | Feb. 7, 1956 |